United States Patent
Roy et al.

(10) Patent No.: US 11,113,609 B2
(45) Date of Patent: Sep. 7, 2021

(54) MACHINE-LEARNING SYSTEM AND METHOD FOR IDENTIFYING SAME PERSON IN GENEALOGICAL DATABASES

(71) Applicant: Ancestry.com Operations Inc., Provo, UT (US)

(72) Inventors: Atanu Roy, Provo, UT (US); Jianlong Qi, Provo, UT (US); Peng Jiang, Provo, UT (US); Aaron Ling, Provo, UT (US); Rey Furner, Provo, UT (US); Lei Wu, Provo, UT (US); Eugene Greenwood, Provo, UT (US); Ian Stiles, Provo, UT (US)

(73) Assignee: ANCESTRY.COM OPERATIONS INC., Lehi, UT (US)

(*) Notice: Subject to any disclaimer, the term of this patent is extended or adjusted under 35 U.S.C. 154(b) by 818 days.

(21) Appl. No.: 15/479,291

(22) Filed: Apr. 5, 2017

(65) Prior Publication Data

US 2017/0293861 A1    Oct. 12, 2017

Related U.S. Application Data

(60) Provisional application No. 62/319,299, filed on Apr. 7, 2016, provisional application No. 62/393,276, filed on Sep. 12, 2016, provisional application No. 62/393,849, filed on Sep. 13, 2016.

(51) Int. Cl.
*G06N 5/02* (2006.01)
*G06F 16/00* (2019.01)

(52) U.S. Cl.
CPC .............. *G06N 5/025* (2013.01); *G06F 16/00* (2019.01)

(58) Field of Classification Search
CPC .................................. G06F 16/00; G06N 5/025
See application file for complete search history.

(56) References Cited

U.S. PATENT DOCUMENTS

| | | | |
|---|---|---|---|
| 5,506,865 A | | 4/1996 | Weaver, Jr. |
| 5,606,653 A | * | 2/1997 | Gilmore, Jr. ......... G06T 11/203 345/440 |
| 9,390,225 B2 | * | 7/2016 | Barber .............. G06F 16/24575 |
| 10,140,342 B2 | * | 11/2018 | Cevahir ................ G06F 16/285 |
| 2007/0168368 A1 | * | 7/2007 | Stone .................... G06Q 99/00 |
| 2010/0287213 A1 | * | 11/2010 | Rolls ...................... G16H 10/60 707/803 |
| 2014/0181089 A1 | * | 6/2014 | Desmond ............ G06F 16/5866 707/722 |

(Continued)

*Primary Examiner* — Michael J Huntley
*Assistant Examiner* — Ahsif A. Sheikh
(74) *Attorney, Agent, or Firm* — Kilpatrick Townsend & Stockton LLP

(57) ABSTRACT

Systems and methods for determining whether two tree persons in a genealogical database correspond to the same real-life individual. Embodiments include identifying two tree persons in a genealogical database and extracting a plurality of features from both tree persons to generate two vectors. Embodiments also include calculating a plurality of metrics between the two vectors to generate a metric function. Embodiments further include generating feature weights using a recursive process based on training data input by external users, and generating a score by calculating a weighted sum of the metric function being weighted by the feature weights. The generated score may then be compared to a threshold value.

20 Claims, 8 Drawing Sheets

(56) References Cited

U.S. PATENT DOCUMENTS

| | | | |
|---|---|---|---|
| 2014/0244664 A1* | 8/2014 | Verma | G06Q 30/0251 |
| | | | 707/749 |
| 2015/0363481 A1* | 12/2015 | Haynes | G06Q 10/10 |
| | | | 707/748 |
| 2016/0012280 A1* | 1/2016 | Ito | G06K 9/00268 |
| | | | 382/305 |
| 2016/0275413 A1* | 9/2016 | Shi | G06N 20/00 |
| 2017/0091692 A1* | 3/2017 | Guo | G06F 16/24534 |

* cited by examiner

700

MACHINE-LEARNING SYSTEM AND METHOD FOR IDENTIFYING SAME PERSON IN GENEALOGICAL DATABASES

CROSS-REFERENCES TO RELATED APPLICATIONS

This Application claims priority to U.S. Provisional Patent Application No. 62/319,299, filed Apr. 7, 2016, entitled "THUNDER COMPARE," to U.S. Provisional Patent Application No. 62/393,276, filed Sep. 12, 2016, entitled "THUNDER COMPARE," and to U.S. Provisional Patent Application No. 62/393,849, filed Sep. 13, 2016, entitled "THUNDER COMPARE," the entire disclosures of which are hereby incorporated by reference, for all purposes, as if fully set forth herein.

BACKGROUND OF THE INVENTION

In certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in genealogical databases has been dealing with duplicate persons with data that are similar but do not perfectly align. This problem arises due to discrepancies between different historical records, discrepancies between historical records and human accounts, and discrepancies between different human accounts. For example, different users having a common ancestor may have different opinions as to the name, dates of birth, and place of birth of that ancestor. The problem becomes particularly prevalent when large amounts of historical documents are difficult to read, causing a wide range of possible personal information. Therefore, there is a need for improved techniques in the area.

BRIEF SUMMARY OF THE INVENTION

Embodiments of the present invention include a method for determining whether two tree persons correspond to the same real-life individual. The method may include identifying a first tree person from a first genealogical tree and a second tree person from a second genealogical tree. The first genealogical tree and the second genealogical tree may include a plurality of interconnected tree persons corresponding to individuals that are related to each other. The method may include extracting a plurality of features from both the first tree person and the second tree person to generate a first feature vector and a second feature vector. The method may include calculating a plurality of metrics between the first feature vector and the second feature vector to generate a metric function containing a plurality of values. The method may include generating feature weights having a plurality of values. The method may include generating a score by calculating a weighted sum of each of the plurality of values of the metric function being weighted by the plurality of values of the feature weights.

In some embodiments, the first genealogical tree may be different than the second genealogical tree. In some embodiments, the method may include cleaning the first tree person or the second tree person by correcting one or more errors within data associated with the first tree person or the second tree person. In some embodiments, each of the plurality of values of the metric function may be greater than or equal to 0 and less than or equal to 1. In some embodiments, each of the plurality of values of the feature weights may be greater than or equal to 0 and less than or equal to 1. In some embodiments, the score may be greater than or equal to 0 and less than or equal to 1. In some embodiments, the feature weights may be generated based on a comparison between the first feature vector and the second feature vector and a set of training data previously input by a user.

In some embodiments, the method may include determining that the first tree person and the second tree person correspond to a same individual when the score exceeds a threshold value. In some embodiments, the threshold value may be equal to 0.9 in some embodiments, the plurality of metrics between the first feature vector and the second feature vector may include a cosine similarity calculation and a Jaro-Winkler calculation. In some embodiments, both the first feature vector and the second feature vector may include 40 different features including a first name, a last name, a birth month, a birth day, a birth year, a death month, a death day, and a death year for each of a tree person, a father of the tree person, a mother of the tree person, a spouse of the tree person, and a child of the tree person.

Embodiments of the present invention also include a computer readable storage media comprising instructions to cause one or more processors to perform operations comprising the method. Embodiments of the present invention further include a system comprising one or more processors and one or more computer readable storage mediums comprising instructions to cause the one or more processors to perform operations comprising the method.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
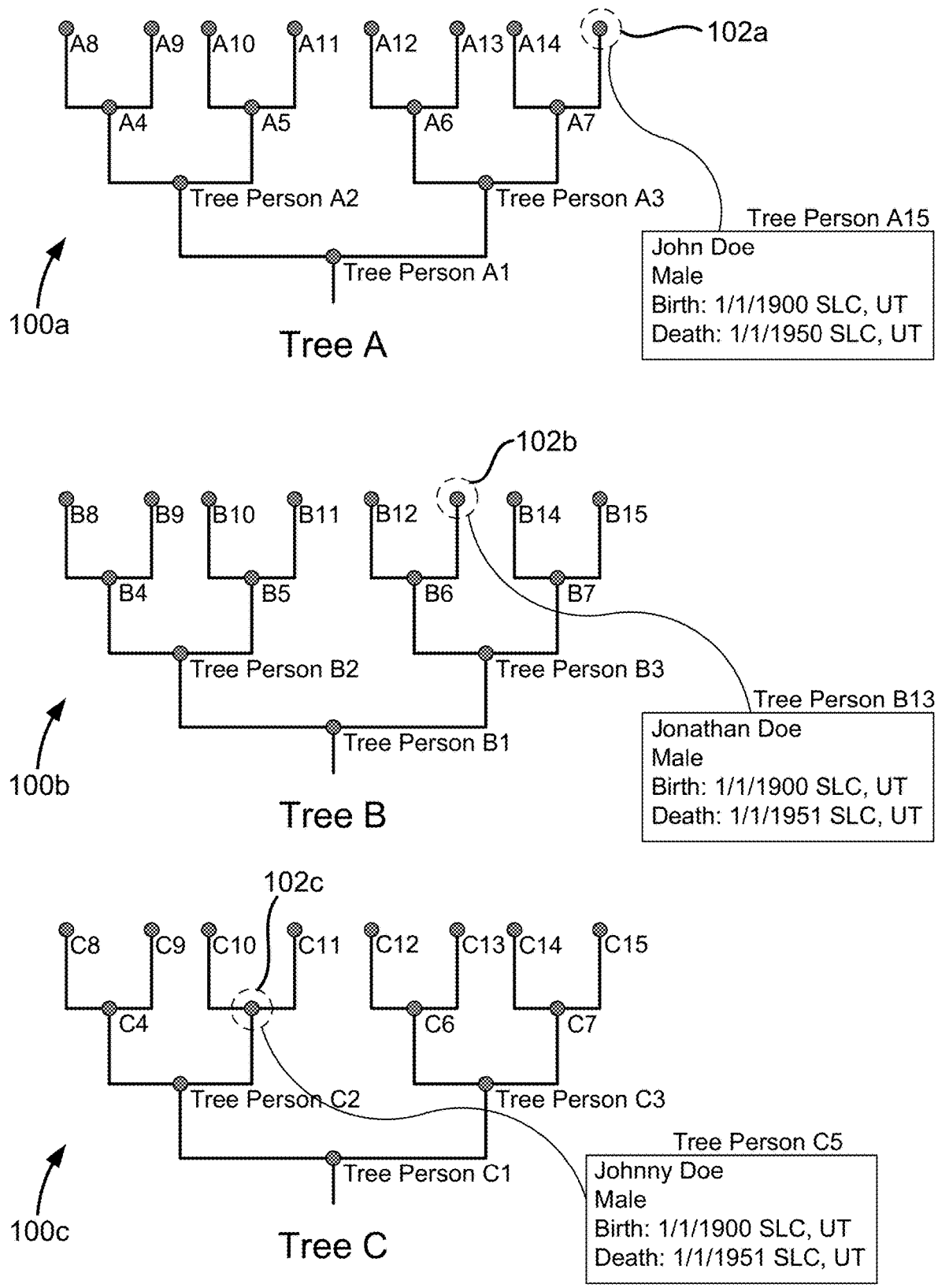
FIG. 1 illustrates various trees having similar individuals, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Genealogical databases often contain huge amounts of information that include trees, persons, and intra-tree relationships among persons. Many trees contain persons that correspond to persons in other trees, as users have common ancestors with other users. The advantage of identifying these duplicate persons is that one user may have information for their ancestor that another user does not. As more duplicate persons are identified, rather than list every duplicate person for the user to browse, it may be more helpful to show a user an aggregation of all the duplicates merged together in a single, concise view of the cluster (i.e., a grouping of duplicate persons). Another advantage of identifying duplicate persons is that if users A and B have a duplicate person in their family trees, then it can be determined that users A and B are related to each other at least via the duplicate person. Furthermore, once the duplicate person is identified, user A may supplement his/her family tree with information from user B's family tree, and vice-versa.

Persons from different trees that are determined to correspond to the same real-life individual may be grouped together in a cluster. Persons in a cluster have varying degrees of data quality/completeness, as well as similarity with other persons in the cluster. Users may prefer to view all persons in a cluster, and may have different preferences when grouping persons in a cluster. Some may prefer to have high-quality or high-similarity requirements (which decreases the size of the cluster). Others may prefer to have larger clusters by allowing persons with less quality or lower similarity.

Definitions

As used herein, the terms "tree", "family tree", and "genealogical tree" may be used interchangeably and may refer to a finite number of related persons that are interconnected in the tree according to their relationships. Two persons that are directly connected in a tree may be in a parent-child relationship, in a sibling relationship, or in some other relationship. A tree may be displayed as various points connected by lines. The base or bottom of the tree may comprise a single individual, which may or may not be a user of the tree.

As used herein, the terms "tree person", "person", "individual", and "node" may be used interchangeably and may refer to a representation in a tree of a living or deceased real-life individual.

As used herein, the term "user" may refer to an owner or creator of a tree, or may refer to any entity, human or non-human, that is currently using a tree or genealogical database in some manner.

As used herein, the term "cluster" may refer to a grouping of tree persons, each from different trees and each determined to correspond to the same real-life individual. Although clusters are designed to group only tree persons that correspond to the same real-life individual, this is not always possible, and often clusters are either overinclusive or underinclusive based on the similarity threshold that is employed.

Person Compare System

The present disclosure describes systems, methods, and other techniques for determining whether two persons in a genealogical database, either from the same tree or from two different trees, correspond to the same real-life individual.

FIG. 1 illustrates trees 100*a-c*, each having similar individuals 102*a-c*, according to an embodiment of the present disclosure. Trees 100*a-c* are also denoted as Trees A, B, and C, respectively. Trees A, B, and C may be owned by, created by, and/or used by Tree Persons A1, B1, and C1, or by some other users unrelated to persons in Trees A, B, and C. In some embodiments, it may be determined that Tree Person A15 (named "John Doe"), Tree Person B13 (named "Jonathan Doe"), and Tree Person C5 (named "Johnny Doe") correspond to the same real-life individual based on their similarity. Although a user of Tree A may understand Tree Person A15 to be John Doe, it may be beneficial to that user to become aware of the information discovered by the users of Trees B and C, who understand John Doe to in fact have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to identify, group, and possibly merge together tree persons that are determined to correspond to the same real-life individual.

One method for determining whether Tree Persons A15, B13, and C5 correspond to the same real-life individual is a rule-based algorithm in which a human expert looks at different pairs of persons and creates rules. For example, consider that two persons are named "Jack Smith" but one is born in Mar. 1, 1981 and the other is born in Mar. 1, 1932. A rule-based algorithm may generate four separate scores, one for a comparison of the names (a high score in this example), one for a comparison of the month of birth (a high score in this example), one for a comparison of the day of birth (a high score in this example), and one for the year of birth (a low score in this example). The four separate scores are added together to generate a final similarity score. The higher the similarity score, the higher the probability that the two tree persons correspond to the same real-life individual.

There are several disadvantages to rule-based algorithms. First, they are subjective. When scores are combined into a final similarity score, they may be weighted such that the final similarity score is overly sensitive to the chosen weighting, which may be arbitrary. Second, rule-based algorithms become extremely complicated as they must account for several special cases, such as popular names. Third, rule-based algorithms are difficult to update and maintain. Over time, there may be hundreds of rules to generate a single final similarity score. If new special cases arise, a human expert has to verify whether all the previously generated rules will apply to the new case or not. If a particular rule does not apply, then it needs to be changed.

Figure 2:
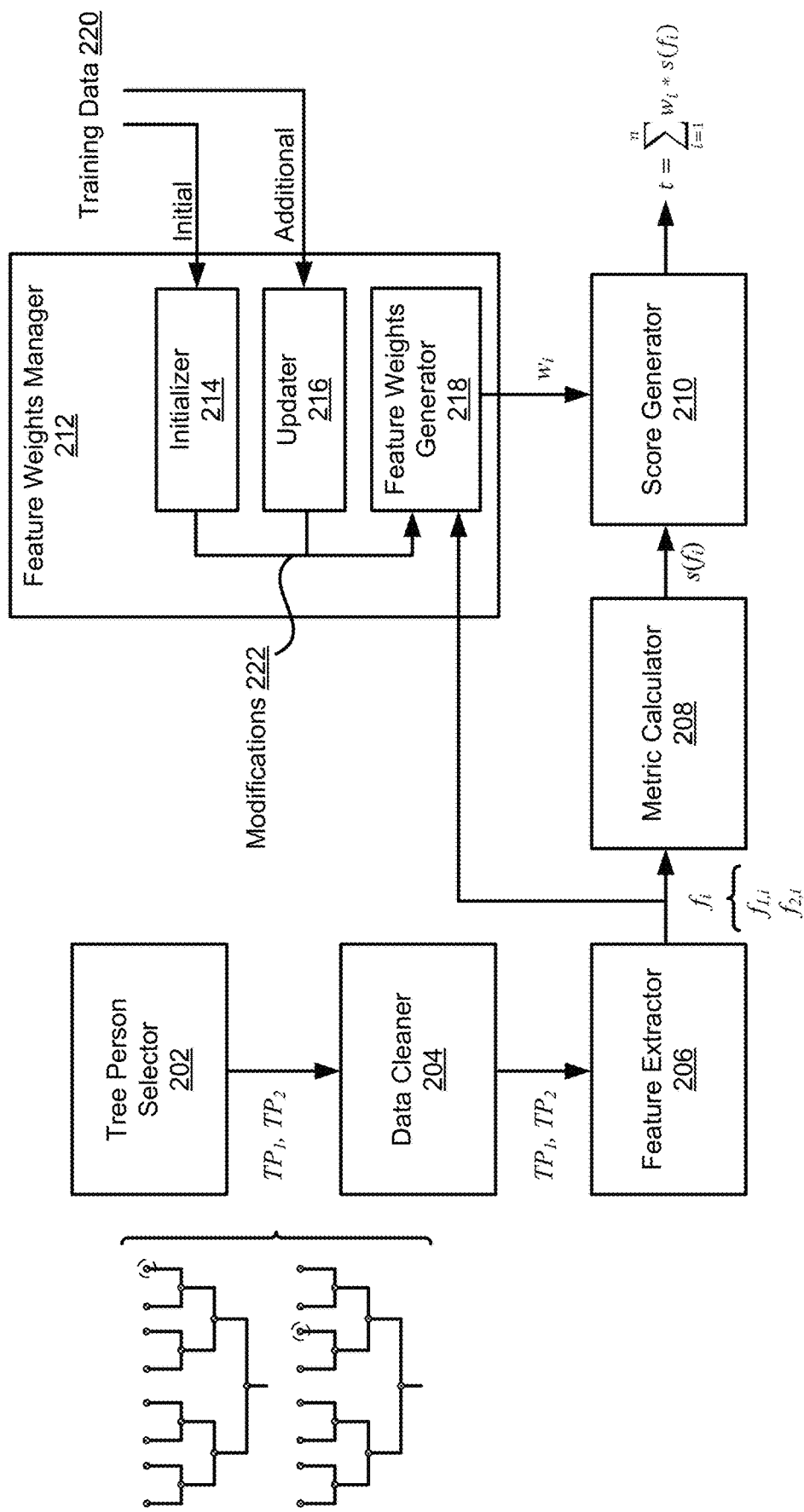
FIG. 2 illustrates a block diagram of a person compare system, according to an embodiment of the present disclosure.

FIG. 2 illustrates a block diagram of a person compare system 200, according to an embodiment of the present disclosure. Another approach for determining whether Tree Persons A15, B13, and C5 correspond to the same real-life individual is the person compare system 200 which merges multiple different scoring systems and generates a more accurate and easy to maintain approach. The person compare system 200 is a machine-learning based approach. One idea behind the person compare system 200 is that one single scoring system may not be very accurate for all the special cases that are encountered in the real world but may still be somewhat correlated to the true similarity score. Based on different cases represented by specific machine understandable features, a machine learning algorithm can help determine how correlated each scoring system is to the actual label, which may come from well-trained expert judgment. If the correlation among different scoring systems can be learned, then the score that is generated will be closer to an expert label.

The person compare system 200 includes a tree person selector 202 for selecting two tree persons, referred to as $TP_1$ and $TP_2$, from a genealogical database or from two separate genealogical databases. Tree persons $TP_1$ and $TP_2$ may be selected from the same family tree or from two different family trees. In some embodiments, a rule-based algorithm is first used to resolve obvious cases, such as birth dates being hundreds of years apart and first and last names having no similarity. In some embodiments, the selection of tree persons $TP_1$ and $TP_2$ is completely random.

The person compare system 200 also includes a data cleaner 204 for cleaning the data associated with tree persons $TP_1$ and $TP_2$. This may include correcting one or more errors within the data associated with tree persons $TP_1$ and $TP_2$, referred to as tree data. For example, the data cleaner 204 may correct misspelled entries in the tree data. The data cleaner 204 may also normalize a place, such as an address, by transforming the format of the street, county, city, and country into a correct format.

The person compare system 200 includes a feature extractor 206 for extracting features $f_i$ from tree persons $TP_1$ and $TP_2$. Features f includes two vectors, a first feature vector $f_{1,i}$ corresponding to tree person $TP_1$ and a second feature vector $f_{2,i}$ corresponding to tree person $TP_2$. Both the first feature vectorA, and the second feature vector $f_{2,i}$ include 40 features that are extracted from the tree data of tree persons $TP_1$ and $TP_2$. Specifically, the featuresf comprise the following: first name, last name, birth month, birth day, birth year, death month, death day, death year defined on five persons: self, father, mother, spouse, and children. In some embodiments, both the first feature vector $f_{1,i}$ and the second feature vector $f_{2,i}$ may include 50 features, with the addition of birth place and death place defined on the same five persons. In some embodiments, the number of features n may exceed 50 when tree persons $TP_1$ and $TP_2$ have multiple children.

The person compare system 200 includes a metric calculator 208 for calculating metrics between the first feature vector $f_{1,i}$ and the second feature vector $f_{2,i}$ to generate a metric function $s(f_i)$. If the number of features is equal to n, then the metric calculator 208 calculates n different metrics (or less than n different metrics) between the first feature vector $f_{1,i}$ and the second feature vector $f_{2,i}$, such that the metric function $s(f_i)$ is defined on each feature $f_i$. For example, if n=2 and $f_{1,i}$=("John", 1956) and $f_{2,i}$=("John", 1958), then a first metric may be calculated based on the difference between the two strings ("John" and "John") to be equal to 1, and a second metric may be calculated based on the difference between the two integers (1956 and 1958) to be equal to 0.83. The resulting metric function $s(f_i)$ in this example would be equal to (1, 0.83). Metrics may yield values between 0 and 1, where 0 indicates low similarity and 1 indicates high similarity. In some embodiments, metrics are not restricted to yield values between 0 and 1. A specific example of how the metric function $s(f_i)$ is generated is described in reference to FIG. 3.

In some embodiments, the Jaro-Winkler distance is used as the metric between two strings and cosine-similarity is used as the metric between any two non-strings, such as integers and vectors. Other possible metrics that may be employed within the metric calculator 208 include but are not limited to: edit distance, affine gap distance, Smith-Waterman distance, and Q-gram distance. In one embodiment, the metric calculator 208 employs Jaro-Winkler distance as the metric for features about first name, last name, birth place, death place, and race, and cosine-similarity is used as the metric for birth month, birth day, birth year, death month, death day, and death year.

The person compare system 200 includes a score generator 210 for calculating a score t that is indicative of the similarity between tree persons $TP_1$ and $TP_2$. The score t is generated based on a weighted sum of the metric function $s(f_i)$ being weighted by the feature weights $w_i$. Specifically, the score t is calculated using the following equation:

$$t = \sum_{i=1}^{n} w_i * s(f_i)$$

where n is the number of features $f_i$ and $w_i$ is the feature weight for the i-th feature $f_i$. In some embodiments, when there is insufficient training data 220, the feature weights may be set to 1/n such that each value of the metric function $s(f_i)$ is weighted equally.

The person compare system 200 includes a feature weights manager 212 for generating the feature weights $w_i$ based on the features $f_i$. The goal of the feature weights manager 212 is to generate the feature weights $w_i$ that yield a score t that is an accurate indication of the similarity between tree persons $TP_1$ and $TP_2$. For example, based on the specific features $f_i$ for particular tree persons $TP_1$ and $TP_2$, it may be that features $f_i$ corresponding to first names and last names are less important than features $f_i$ corresponding to birth year and death year, and therefore the feature weights manager 212 may generate feature weights $w_i$ with lower values for such features $f_i$. Specifically, the feature weights manager 212 includes a feature weights generator 212 that receives features $f_i$ from the feature extractor 206 and calculates the feature weights $w_i$ by inputting the features $f_i$ into a trained model. The trained model is contained within the feature weights generator 218 and is trained with training data 220. The training process is described in further detail in reference to FIG. 5.

Figure 3:
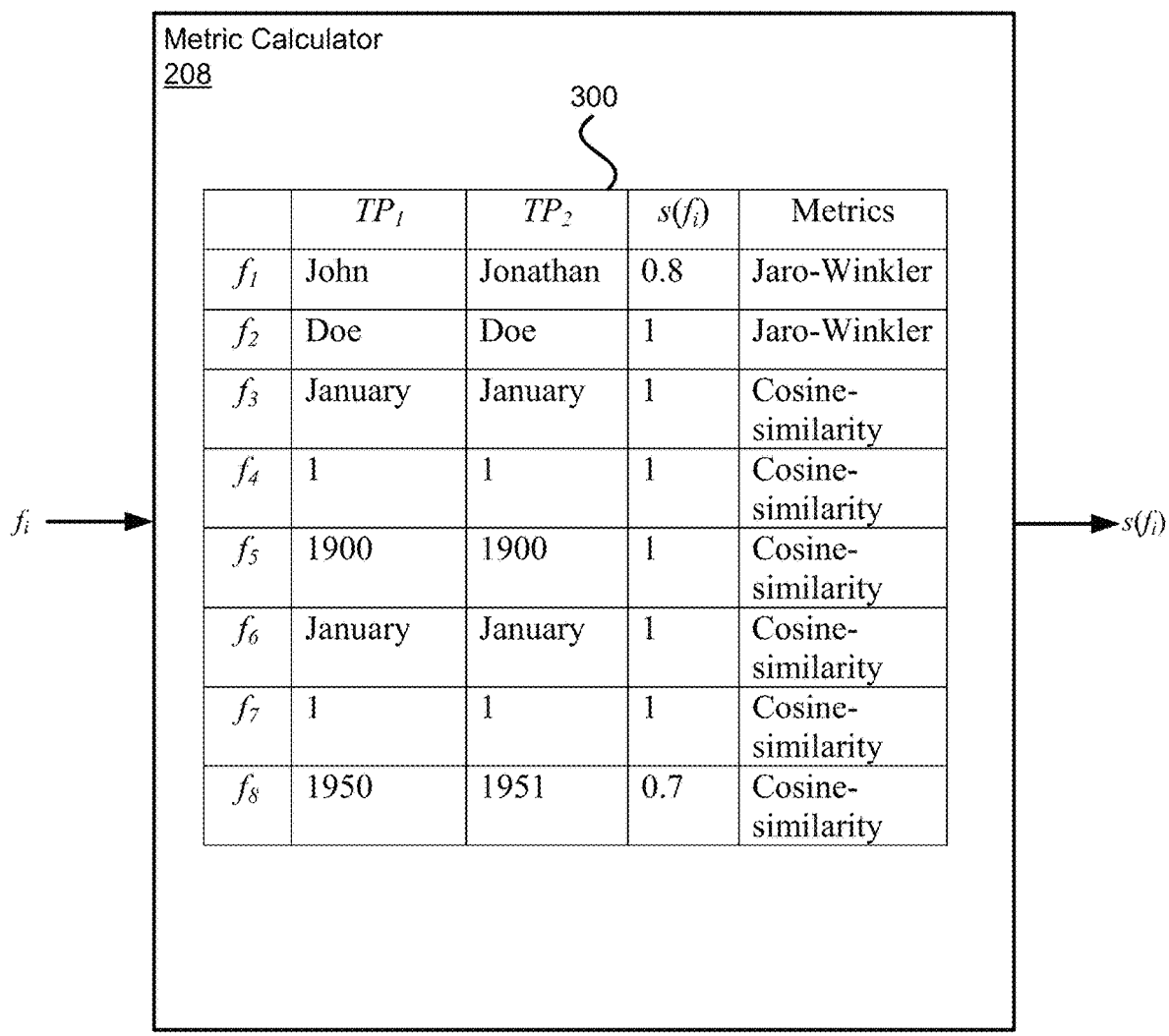
FIG. 3 illustrates an exemplary operation of a metric calculator, according to an embodiment of the present disclosure.

FIG. 3 illustrates an exemplary operation of the metric calculator 208, according to an embodiment of the present disclosure. For a tree person $TP_1$ corresponding to tree person 102a and a tree person $TP_2$ corresponding to tree person 102b, the feature extractor 206 extracts the features $f_i$ shown in the second and third columns of table 300 and sends the features $f_i$ to the metric calculator 208. The metric calculator 208 uses the metrics specified in the fifth column of table 300 to calculate the metric function $s(f_i)$ shown in the fourth column. The metric calculator 208 then outputs the metric function $s(f_i)$ to the score generator 210.

Figure 4:
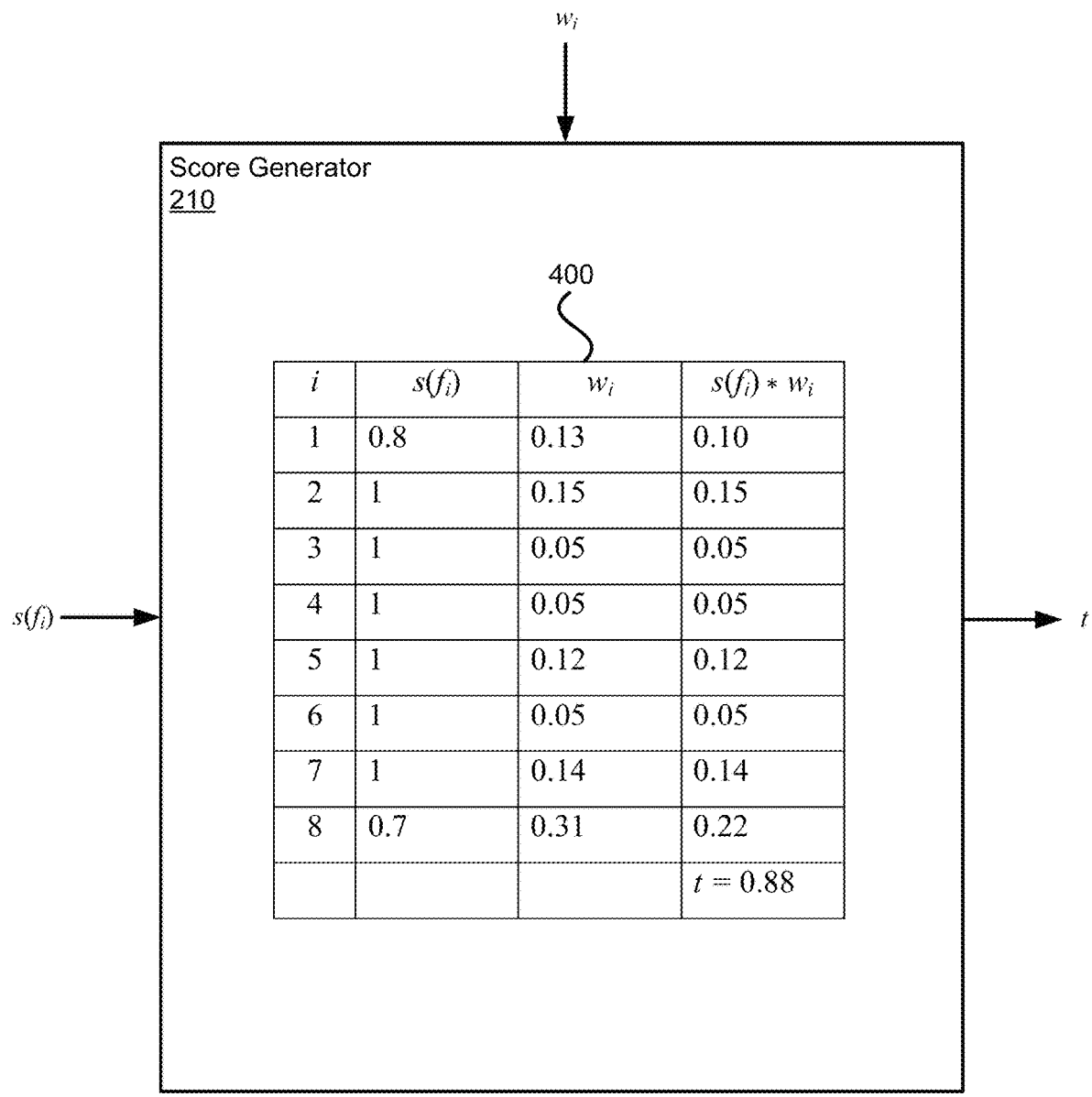
FIG. 4 illustrates an exemplary operation of a score generator, according to an embodiment of the present disclosure.

FIG. 4 illustrates an exemplary operation of the score generator 210, according to an embodiment of the present disclosure. The score generator 210 receives the metric function $s(f_i)$ shown in the second column of table 400 from the metric calculator 208 and the feature weights $w_i$ shown in the third column of table 400 from the feature weights manager 212 (specifically the feature weights generator 218). The fourth column of table 400 is calculated by multiplying the second column with the third column of table 400. The score t is then generated by summing the values in the fourth column of table 400. In some embodiments, the score generator 210 is efficiently implemented in hardware using a dot product circuit. The dot product circuit may include a multiplying circuit and a summing circuit, as described in reference to U.S. Pat. No. 5,506,865.

The score t is compared to a threshold value to determine whether tree persons $TP_1$ and $TP_2$ correspond to the same real-life individual. The threshold value may be constant, or may be modified by the feature weights manager 212 depending on the features $f_i$ that are extracted from tree persons $TP_1$ and $TP_2$. For example, the threshold value may be set to 0.9 such that tree persons $TP_1$ and $TP_2$ having a score t of 0.88 are determined to not correspond to the same real-life individual. By way of another example, if tree persons $TP_1$ and $TP_2$ have few features $f_i$ such that n is small, the threshold value may be adjusted to 0.95 to account for a higher requirement of similarity between the fewer number of available features $f_i$. By way of another example, if tree persons $TP_1$ and $TP_2$ have numerous features $f_i$ such that n is large, the threshold value may be adjusted to 0.85 to account for a lower requirement of similarity between the greater number of available features $f_i$.

In some embodiments, the threshold value is multiplied by a threshold factor k which is inversely proportional to the number of features n in order to adjust the required similarity between tree persons $TP_1$ and $TP_2$ based on the number of available features $f_i$. For example, in some embodiments the threshold factor k is equal to $1/n$. In other embodiments, the threshold factor k is equal to $e^{-n}$. In some embodiments, the threshold factor k is not only dependent on the number of features n but is also dependent on the training data size l. For example, as the training data size l increases, the feature weights $w_i$ become more accurate and the threshold factor k may be adjusted to reflect this increased accuracy.

Figure 5:
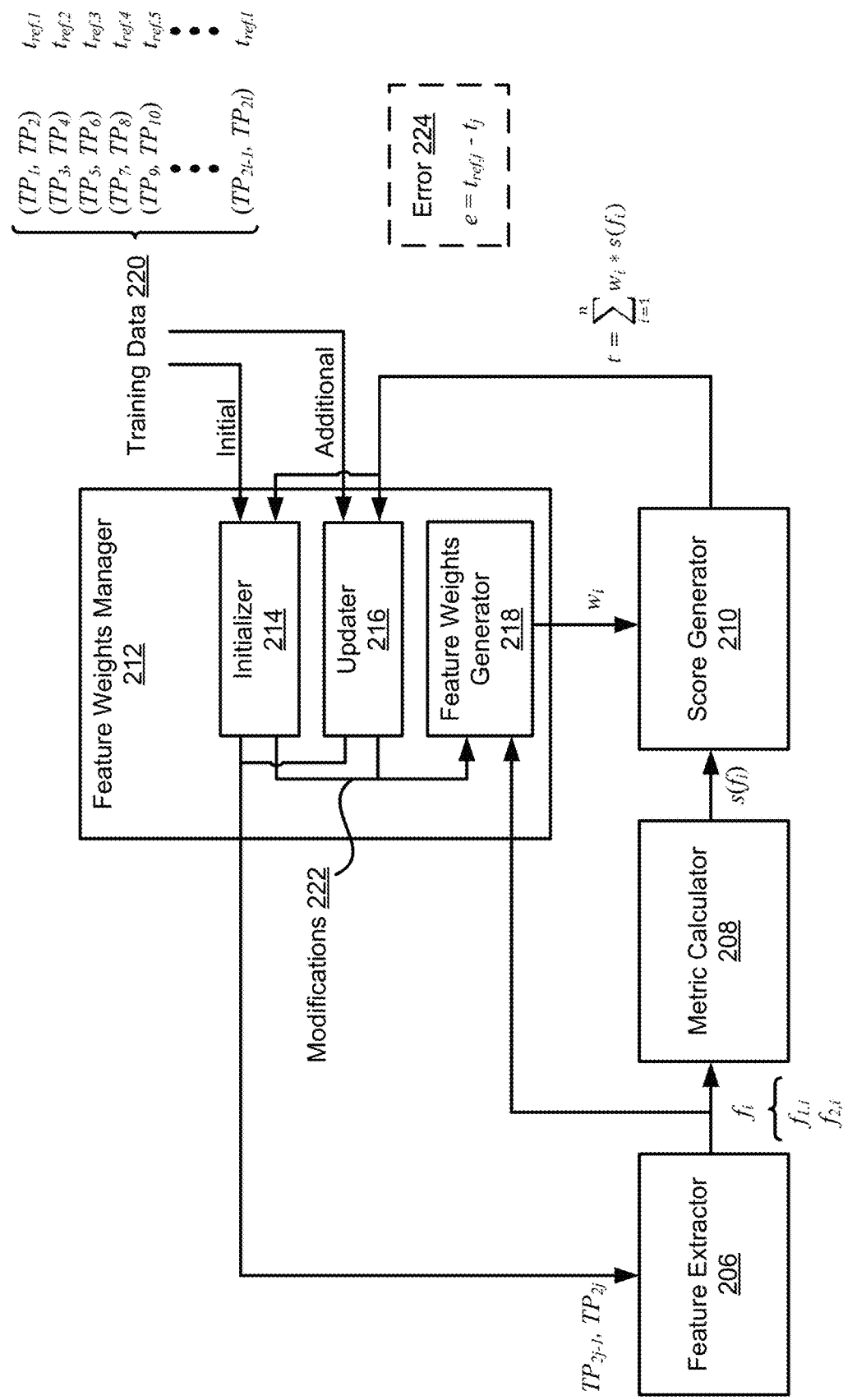
FIG. 5 illustrates a training process of a person compare system, according to an embodiment of the present disclosure.

FIG. 5 illustrates a training process of the person compare system 200, according to an embodiment of the present disclosure. The training process trains a model contained within the feature weights generator 218 using training data 220. Training data 220 is input by external users, generally one or more genealogy experts, who input reference scores $t_{ref,j}$ (either 0's or 1's) indicating whether certain tree persons $TP_{2j-1}$ and $TP_{2j}$ reviewed by the external users were determined to correspond to the same real-life individual. The training process of the model includes receiving training data 220 from the external users, either initially by the initializer 214 or later by the updater 216, and sending tree persons $TP_{2j-1}$ and $TP_{2j}$, to the feature extractor 206. The score t that is generated using tree persons $TP_{2j-1}$ and $TP_{2j}$ is compared to the reference score $t_{ref,j}$ within the initializer 214 or the updater 216. The initializer 214 or the updater 216 then computes an error 224 equal to $e=t_{ref,j}-t_j$ and sends modifications 222 to the feature weights generator 218 based on the error 224. The modifications 222 are applied to the model which affects how the feature weights $w_i$ are generated. When error 224 is large, the effect of the modifications 222 to the model is greater. When error 224 is small, or even zero, the effect of the modifications 222 to the model is smaller, or even negligible. Thus, through the recursive training process described, the feature weights $w_i$ that are generated by the feature weights generator 218 are calibrated to yield a score t that is consistent with the training data 220.

The person compare system 200 has several advantages over other approaches. First, the system is extremely accurate if the training data 220 is sufficiently large. The quality of training data 220 can also affect the accuracy of the approach. Second, the system is easy to maintain and upgrade. Since the whole process is automatically learning by machine, to upgrade the system is as easy as adding more special cases to the training data 220 and allowing the updater 216 to provide additional modifications 222 to the model. Third, the compare speed is much faster than other approaches, and the training process is all machine-learning based and is faster than rule-based approaches.

Figure 6:
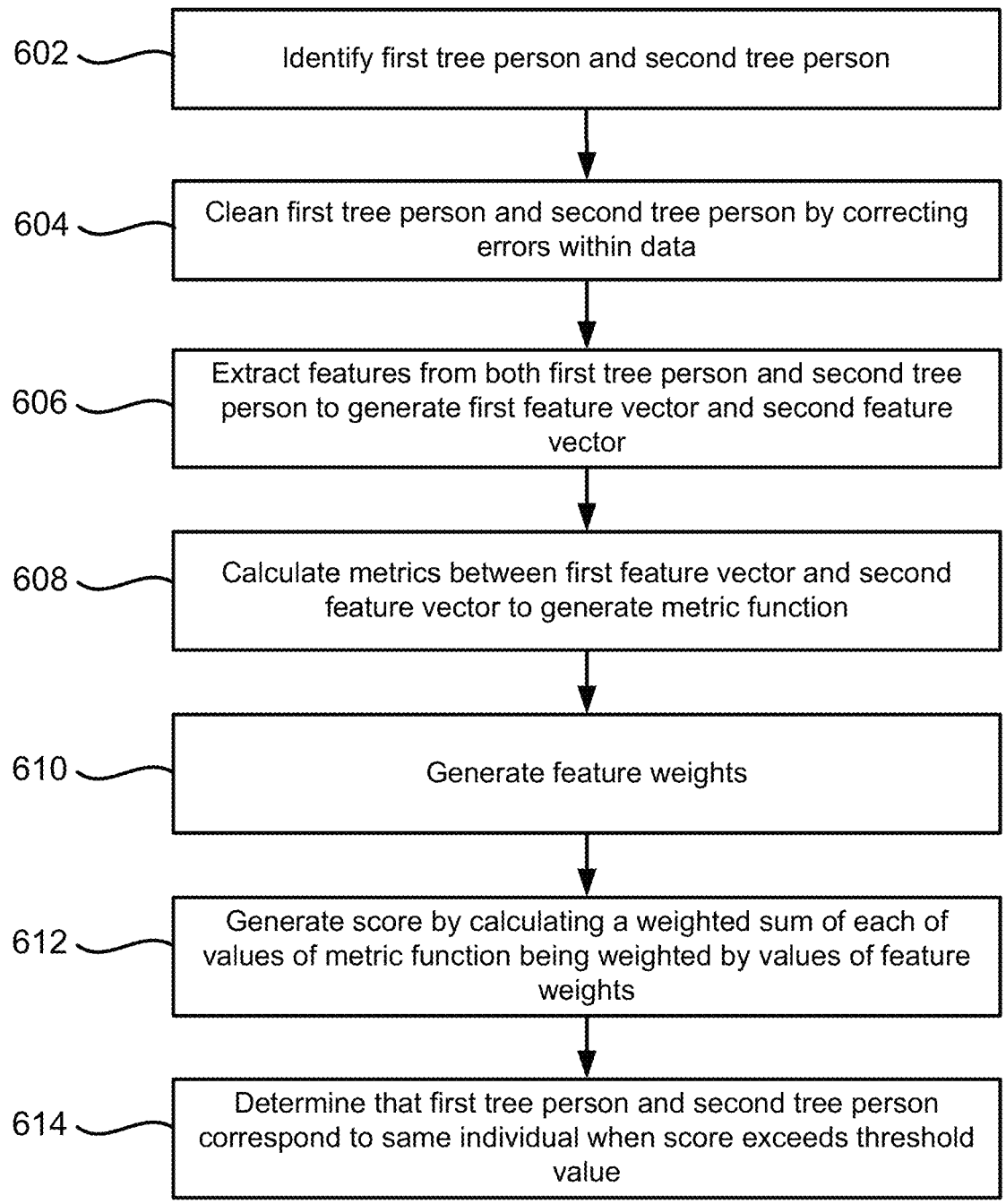
FIG. 6 illustrates a method for determining whether two tree persons correspond to the same real-life individual, according to an embodiment of the present disclosure.

FIG. 6 illustrates a method 600 for determining whether two tree persons correspond to the same real-life individual, according to an embodiment of the present disclosure. Method 600 may be performed by person compare system 200. At step 602, a first tree person from and a second tree person are identified. At step 604, the first tree person and the second tree person are cleaned by correcting errors within data associated with the first tree person and the second tree person. At step 606, a plurality of features from both the first tree person and the second tree person are extracted to generate a first feature vector and a second feature vector. At step 608, a plurality of metrics between the first feature vector and the second feature vector are calculated to generate a metric function containing a plurality of values. At step 610, feature weights having a plurality of values are generated. At step 612, a score is generated by calculating a weighted sum of each of the plurality of values of the metric function being weighted by the plurality of values of the feature weights. At step 614, it is determined that the first tree person and the second tree person correspond to a same individual when the score exceeds a threshold value.

Figure 7:
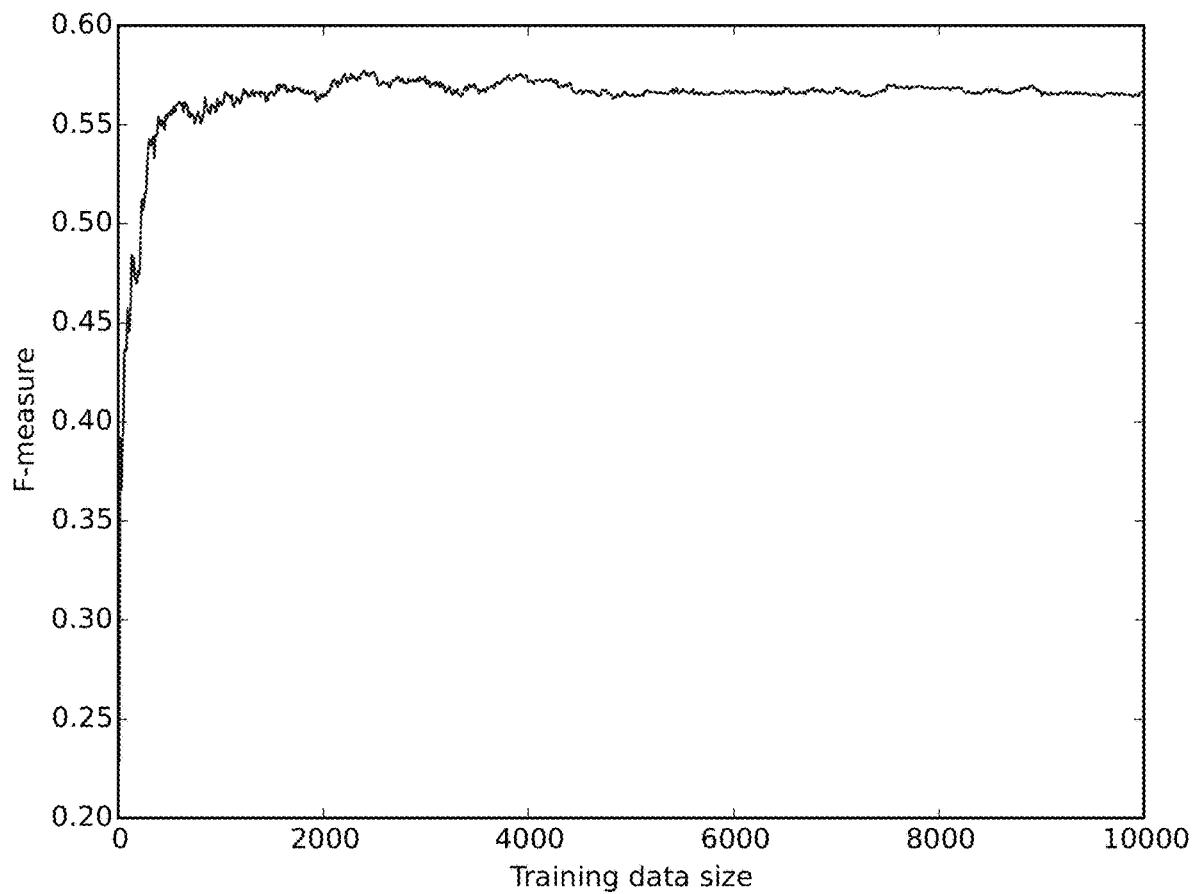
FIG. 7 illustrates a plot showing the accuracy of a person compare system, according to an embodiment of the present disclosure.

FIG. 7 illustrates a plot 700 showing the accuracy of the person compare system 200 as a function of training data size l, according to an embodiment of the present disclosure. Plot 700 shows that the person compare system 200 achieves a high level of accuracy with a relatively small training data size (~500).

Simplified Computer System

Figure 8:
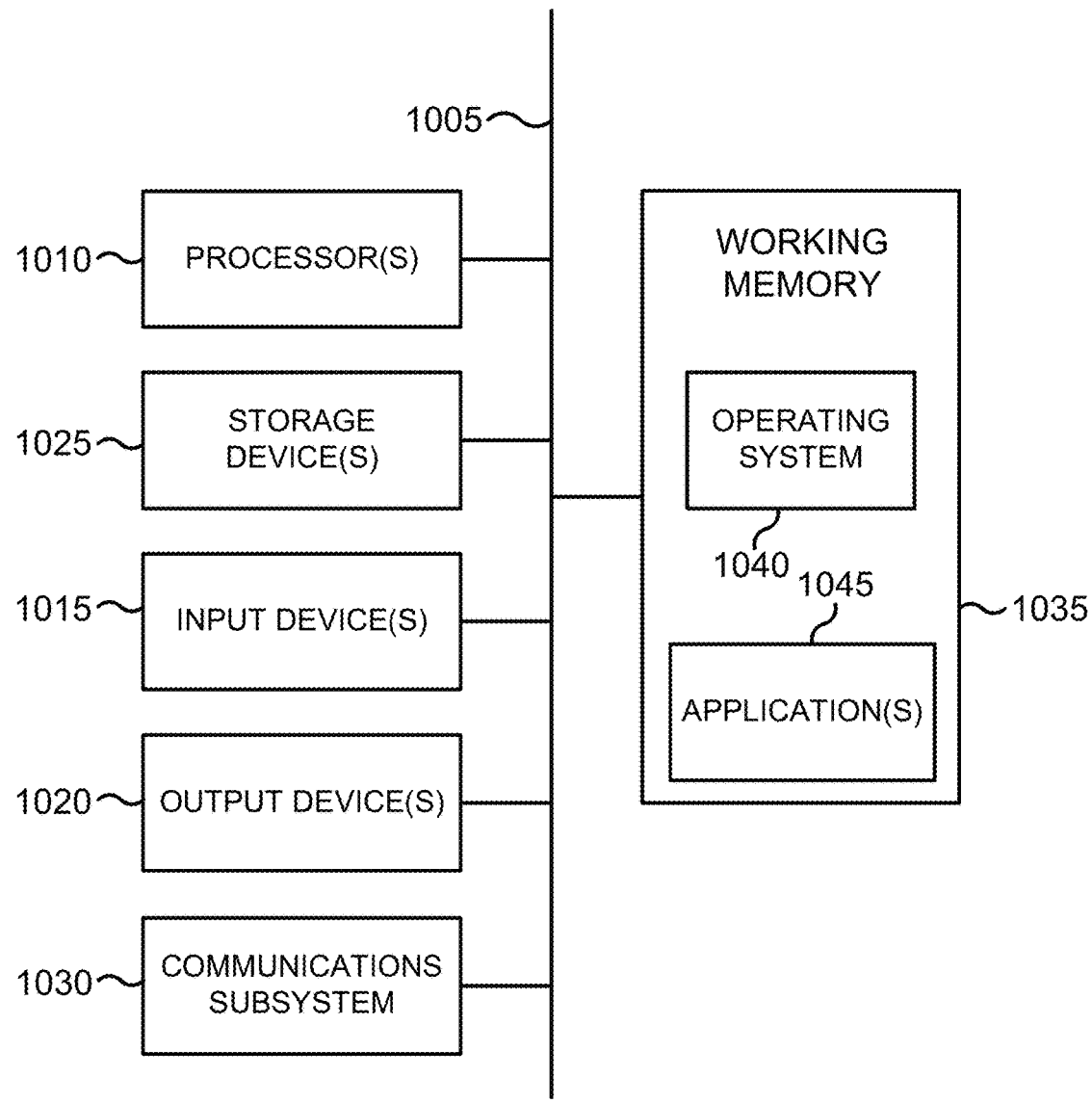
FIG. 8 illustrates a simplified computer system, according to an embodiment of the present disclosure.

FIG. 8 shows a simplified computer system 800, according to some embodiments of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure.

For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

LIST OF TERMS

Trees 100a, 100b, and 100c
Tree Persons 102a, 102b, and 102c
Person Compare System 200
Tree Person Selector 202
Data Cleaner 204
Feature Extractor 206
Metric Calculator 208
Score Generator 210
Feature Weights Manager 212
Initializer 214
Updater 216
Feature Weights Generator 218
Training Data 220
Modifications 222
Error 224
Person Compare Method 600
Tree Persons $TP_1$ and $TP_2$
Features $f_1$
Feature Vectors $f_{1,i}$ and $f_{2,i}$
Metric Function $s(f_i)$
Feature Weights $w_i$
Score t
Number of Features n
Threshold Factor k
Training Data Size l

What is claimed is:

1. A computer-implemented method comprising:
identifying a first tree person from a first genealogical tree and a second tree person from a second genealogical tree, wherein both the first genealogical tree and the second genealogical tree comprise a plurality of interconnected tree persons corresponding to individuals that are related to each other;
extracting a plurality of features from both the first tree person and the second tree person to generate a first feature vector and a second feature vector;
after extracting the plurality of features from both the first tree person and the second tree person, calculating a plurality of metrics between the first feature vector and the second feature vector to generate a metric function containing a plurality of values, wherein each of the plurality of metrics corresponds to a similarity between a first feature from the first feature vector and a second feature from the second feature vector that corresponds to the first feature;
generating feature weights having a plurality of values by inputting the plurality of features into a machine-learning model, wherein the machine-learning model is configured to output the feature weights based on receiving an input comprising the plurality of features, wherein, prior to generating the feature weights, the machine-learning model was trained by:
providing training data comprising pairs of tree persons to the machine-learning model; and
modifying the machine-learning model using an error computed based on an output of the machine-learning model when provided with the training data; and
generating a score by calculating a weighted sum of the plurality of values of the metric function being weighted by the plurality of values of the feature weights, wherein the weighted sum is calculated by weighting each of the plurality of values of the metric function by a corresponding value from the plurality of values of the feature weights.

2. The computer-implemented method of claim 1, wherein the first genealogical tree is different than the second genealogical tree.

3. The computer-implemented method of claim 1, further comprising:
cleaning the first tree person or the second tree person by correcting one or more errors within data associated with the first tree person or the second tree person.

4. The computer-implemented method of claim 1, wherein:
each of the plurality of values of the metric function are greater than or equal to 0 and less than or equal to 1;
each of the plurality of values of the feature weights are greater than or equal to 0 and less than or equal to 1; and
the score is greater than or equal to 0 and less than or equal to 1.

5. The computer-implemented method of claim 1, wherein the feature weights are generated based on a comparison between the first feature vector and the second feature vector and a set of training data previously input by a user.

6. The computer-implemented method of claim 1, further comprising:
determining that the first tree person and the second tree person correspond to a same individual when the score exceeds a threshold value.

7. The computer-implemented method of claim 6, wherein the threshold value is equal to 0.9.

8. The computer-implemented method of claim 1, wherein the plurality of metrics between the first feature vector and the second feature vector includes a cosine similarity calculation and a Jaro-Winkler calculation.

9. The computer-implemented method of claim 1, wherein both the first feature vector and the second feature vector include 40 different features including a first name, a last name, a birth month, a birth day, a birth year, a death month, a death day, and a death year for each of a tree person, a father of the tree person, a mother of the tree person, a spouse of the tree person, and a child of the tree person.

10. A non-transitory computer readable storage media comprising instructions to cause one or more processors to perform operations comprising:
identifying a first tree person from a first genealogical tree and a second tree person from a second genealogical tree, wherein both the first genealogical tree and the second genealogical tree comprise a plurality of interconnected tree persons corresponding to individuals that are related to each other;
extracting a plurality of features from both the first tree person and the second tree person to generate a first feature vector and a second feature vector;
after extracting the plurality of features from both the first tree person and the second tree person, calculating a plurality of metrics between the first feature vector and the second feature vector to generate a metric function containing a plurality of values, wherein each of the plurality of metrics corresponds to a similarity between a first feature from the first feature vector and a second feature from the second feature vector that corresponds to the first feature;
generating feature weights having a plurality of values by inputting the plurality of features into a machine-learning model, wherein the machine-learning model is configured to output the feature weights based on receiving an input comprising the plurality of features, wherein, prior to generating the feature weights, the machine-learning model was trained by:
providing training data comprising pairs of tree persons to the machine-learning model; and
modifying the machine-learning model using an error computed based on an output of the machine-learning model when provided with the training data; and
generating a score by calculating a weighted sum of the plurality of values of the metric function being weighted by the plurality of values of the feature weights, wherein the weighted sum is calculated by weighting each of the plurality of values of the metric function by a corresponding value from the plurality of values of the feature weights.

11. The non-transitory computer readable storage media of claim 10, wherein the first genealogical tree is different than the second genealogical tree.

12. The non-transitory computer readable storage media of claim 10, wherein the operations further comprise:
cleaning the first tree person or the second tree person by correcting one or more errors within data associated with the first tree person or the second tree person.

13. The non-transitory computer readable storage media of claim 10, wherein:
each of the plurality of values of the metric function are greater than or equal to 0 and less than or equal to 1;
each of the plurality of values of the feature weights are greater than or equal to 0 and less than or equal to 1; and
the score is greater than or equal to 0 and less than or equal to 1.

14. The non-transitory computer readable storage media of claim 10, wherein the feature weights are generated based on a comparison between the first feature vector and the second feature vector and a set of training data previously input by a user.

15. The non-transitory computer readable storage media of claim 10, wherein the operations further comprise:
determining that the first tree person and the second tree person correspond to a same individual when the score exceeds a threshold value.

16. The non-transitory computer readable storage media of claim 15, wherein the threshold value is equal to 0.9.

17. The non-transitory computer readable storage media of claim 10, wherein the plurality of metrics between the first feature vector and the second feature vector includes a cosine similarity calculation and a Jaro-Winkler calculation.

18. The non-transitory computer readable storage media of claim 10, wherein both the first feature vector and the second feature vector include 40 different features including a first name, a last name, a birth month, a birth day, a birth year, a death month, a death day, and a death year for each of a tree person, a father of the tree person, a mother of the tree person, a spouse of the tree person, and a child of the tree person.

19. A system comprising:
one or more processors; and
one or more computer readable storage mediums comprising instructions to cause the one or more processors to perform operations comprising:
identifying a first tree person from a first genealogical tree and a second tree person from a second genealogical tree, wherein both the first genealogical tree and the second genealogical tree comprise a plurality of interconnected tree persons corresponding to individuals that are related to each other;
extracting a plurality of features from both the first tree person and the second tree person to generate a first feature vector and a second feature vector;

after extracting the plurality of features from both the first tree person and the second tree person, calculating a plurality of metrics between the first feature vector and the second feature vector to generate a metric function containing a plurality of values, wherein each of the plurality of metrics corresponds to a similarity between a first feature from the first feature vector and a second feature from the second feature vector that corresponds to the first feature;

generating feature weights having a plurality of values by inputting the plurality of features into a machine-learning model, wherein the machine-learning model is configured to output the feature weights based on receiving an input comprising the plurality of features, wherein, prior to generating the feature weights, the machine-learning model was trained by:
providing training data comprising pairs of tree persons to the machine-learning model; and modifying the machine-learning model using an error computed based on an output of the machine-learning model when provided with the training data; and generating a score by calculating a weighted sum of the plurality of values of the metric function being weighted by the plurality of values of the feature weights, wherein the weighted sum is calculated by weighting each of the plurality of values of the metric function by a corresponding value from the plurality of values of the feature weights.

20. The system of claim 19, wherein the feature weights are generated based on a comparison between the first feature vector and the second feature vector and a set of training data previously input by a user.

\* \* \* \* \*